United States Patent Office 3,773,807
Patented Nov. 20, 1973

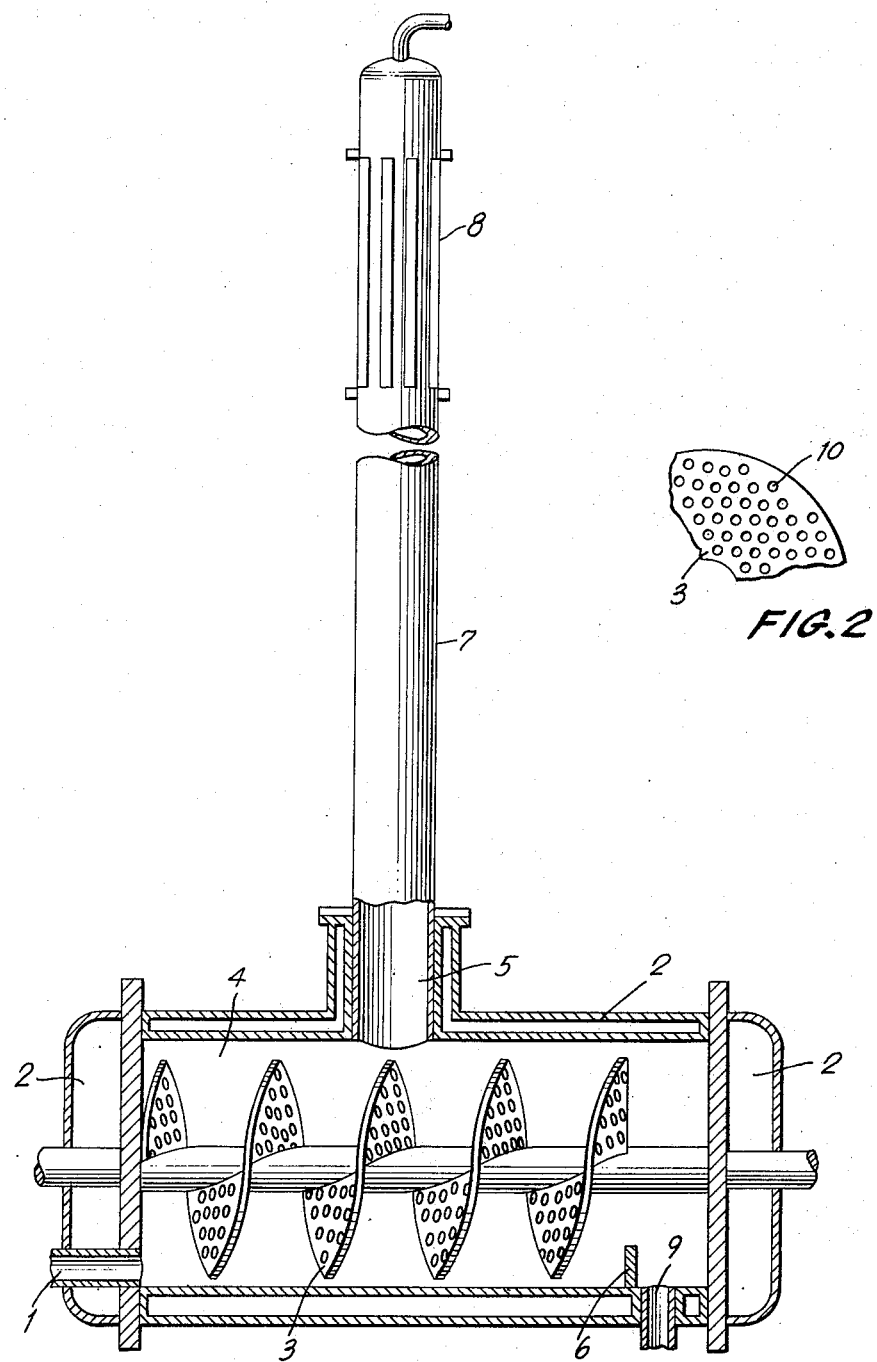

3,773,807
PROCESS FOR CONTINUOUSLY PRODUCING A COMPOUND CAPABLE OF BEING POLYCONDENSED OR POLYMERIZED
Federico Urgesi, Vircelli, Italy, and Horst Rothert, Berlin, Germany, assignors to Chatillon Societa Anonima Italiana per le Fibre Tessili Artificiali S.p.A., Milan, Italy, and Karl Fischer, Apparate- und Rohrleitungsbau, Berlin, Germany
Continuation of abandoned application Ser. No. 519,860, Jan. 11, 1966. This application Nov. 3, 1970, Ser. No. 86,646
Claims priority, application Italy, Jan. 15, 1965, 81,365/65
Int. Cl. C07c 69/82
U.S. Cl. 260—475 P        7 Claims

ABSTRACT OF THE DISCLOSURE

There is provided a process and an apparatus for continuously producing a polymerizable material, the process being dependent upon utilizing differential viscosities of the unreacted materials and the reacted materials, and the apparatus comprising an elongated reactor provided with an inlet at one end and an outlet at the other, means for feeding a continuous stream of mixed, unreacted reactants into the inlet, means for promoting the reaction, and movable means within the reactor for subjecting the material therein to a retaining influence on the more viscous unreacted reactants than on the less viscous reacted portions thereof whereby the reacted portions are permitted to pass through the apparatus, and the unreacted portions are retained pending completion of the reaction.

---

This application is a continuation of Ser. No. 519,860, now abandoned.

The present invention relates to a process and to an apparatus for continuously producing a compound capable of being polycondensed or polymerized, the compound being produced by a reaction of its starting materials, more particularly by esterification of dibasic acids with glycol or by a transesterification of esters of aromatic dicarboxylic acids with glycols.

More specifically, the present invention relates to a process of producing glycol esters of certain dicarboxylic acids, such as monomer bis(2-hydroxyethyl)terephthalate, and to a process of producing glycol esters from aromatic dicarboxylic esters which is another process that can be used to produce monomer bis(2-hydroxyethyl) terephthalate.

A direct reaction of terephthalic acid with ethyl glycol meets with difficulties because of the heterogeneous nature of the reaction. For this reason it has been common practice heretofore to produce terephthalic acid diesters of the dimethyl ester.

It is the object of the present invention to produce a process for the purpose described which is capable of performing the reaction of the reactants continuously. More particularly, it is an object of the present invention to provide an improved process and apparatus which causes the reactants to react with each other continuously while being fed through a reactor space and prevents the reactants from leaving said space before they will have completely reacted with each other.

It is a further object of the present invention to provide an improved apparatus for continuously producing a viscous compound by the reaction of a viscous mixture of starting materials, said mixture having a higher viscosity than said compound, the apparatus being so designed as to insure a complete reaction of the starting materials.

Further objects of the present invention will appear from a detailed description of various embodiments of the invention described hereinafter with reference to the accompanying drawing. It is to be understood, however, that the invention is in no way restricted or limited to such details but is capable of numerous modifications within the scope of the appended claims.

According to the invention the novel process comprises mixing the starting materials and feeding the mixture through an elongated space, heating the mixture within said space to an elevated temperature sufficient to cause said reaction and subjecting the material within said space to a retaining influence exerting a higher retaining force on the more viscous non-reacted portions of said mixture than on the less viscous reacted portions thereof. As a result, the non-reacted portions of the mixture will be retained within the reactor space until they will have completely reacted.

The apparatus constructed in accordance with the invention comprises an elongated reactor vessel provided with an inlet at one of its ends and with an outlet at the other one of its ends, means for feeding a continuous stream of said mixture into said inlet, means for heating said reactor vessel to a temperature sufficient to cause said reaction and movable means mounted within said reactor vessel for subjecting the material therein to a retaining influence exerting a higher retaining force on the more viscous non-reacted portions of said mixture than on the less viscous reacted portions thereof, whereby said means afford continuous passage from said inlet to said outlet substantially to the reacted portions only. The non-reacted portions, however, are retained in the reactor vessel until they will have been completely reacted.

In a preferred embodiment of the apparatus according to the invention, the movable means mounted within the reactor vessel for subjecting the material therein to a retaining influence is formed by a rotary feed screw, the axis of said screw extending lengthwise through the reactor vessel substantially parallel to the horizontal axis thereof. A rectified tower may be mounted on top of the reactor vessel and in communication therewith for the purpose of condensing the vapors produced in the reaction.

The feed screw may be perforated to afford passage to the product of reaction. The direction of rotation of the screw is such that the highly viscous reacting materials are propelled towards the inlet, while the less viscous product of the reaction may flow through the holes and through the gaps between the screw and the wall of the reactor vessel to the outlet in a continuous stream. Preferably, the reactor and the rectifying tower are so designed as to permit an operation of the apparatus under an internal superpressure amounting up to 10 atmospheres.

Glycols useful according to the present invention are those having the general formula $R(OH)_3$, in which R is $C_nH_{2n}$ wherein $n$ is equal to a whole number from 2 to 12.

R may also represent an aromatic-cycloaliphatic group, or an aliphatic-aromatic group. Examples of such glycols are ethylene glycol, butylene glycol, hexamethylene glycol, or glycols having side chains, for example, 1,2-propylene glycol or cyclohexyl dimethanol.

The acid may be terephthalic acid alone, or in mixture to an amount up to 20% with other acids, for example, isophthalic acid, adipic acid, sebacic acid, hexahydro terephthalic acid, etc.

The esterification or transesterification may be carried out in the presence of an esterification catalyst, for example, litharge, zinc acetate, manganese acetate, or calcium acetate, etc.

The process according to the invention will first be described with reference to the esterification of terephthalic acid (hereinafter referred to as "TPS") with ethylene glycol.

TPS is placed in the form of a fine powder in a mixer with the ethylene glycol and with the catalyst required for the reaction. The molecular weight ratio between the TPS and the ethylene glycol may vary from 1:1.1 to 1:3 or above. This ratio of mixture influences the viscosity of the resulting mixture. This viscosity may be also controlled by heating the mixture so as to facilitate the continuous feed of the mixture of the starting materials to the reactor vessel.

Where the quantity of glycol is smaller than that required for a ratio of mixture of TPS to glycol of 1:1.5, it may not be possible to obtain the low viscosity required to obtain the necessary fluidity merely by increasing the temperature. In this case it may be useful to add water in sufficient quantities to reduce the viscosity to a value on the order of 1000 to 3000 poises. The addition of water to the mixture of terephthalic acid, glycol and the catalyst does not affect the reaction because at the high temperature in the reaction vessel the water vaporizes and is vented rapidly from the reaction zone. The only function of the water is that of a fluidizing agent.

In the accompany drawing a preferred embodiment of the apparatus according to the invention is shown.

FIG. 1 illustrates a longitudinal section taken through the reactor vessel, and

FIG. 2 illustrates part of the perforated feed screw.

After the components of the mixture will have been mixed with each other for a sufficient period of time, the mixture is fed by a suitable pump in a continuous stream through a preheater (not shown) into the reactor vessel. This reactor vessel is completely surrounded by a suitable heating jacket through which a suitable heating medium is fed.

A rectifying tower 7 is located on the top of the reactor vessel, preferably near the outlet or discharge end thereof. This tower may contain superimposed overflow plates or it may be filled with a suitable material, such as Raschig rings affording a high surface area for the condensation of the glycol and for the separation of the water vapors. At its top the tower may enclose a partial condenser 8 preferably cooled with heated water so as to insure the condensation of the glycol and the passage of the water vapors to a relief valve and thence into the atmosphere.

Preferably, a pair of mixers of equal size is used to prepare the mixture of the starting materials fed through the inlet 1, the size being so chosen that one of the mixers is capable of supplying a continuous flow of the mixture fed to the inlet 1 of the reactor vessel for an extended period of time amounting to at least two hours. During this period of time the starting materials are mixed in the other mixer. The period of time must be so chosen as to be sufficient to obtain a very uniform mixture as a result of the mixing operation. Therefore, the pair of mixers must be so dimensioned that a new batch of mixture is in readiness in the one mixer at the time when the other mixer has become empty upon feed of its contents into the inlet 1. When this condition is complied with, the reaction vessel can be supplied with the reaction mixture continuously. If desired, however, a continuously operating mixer may be substituted for the pair of mixers.

The reactor vessel including its end walls is provided with a hollow jacket 2 through which a heating medium may be fed whereby the temperature prevailing within the vessel can be controlled. The feed screw 3 can be mounted eccentrically in such a manner that it will not occupy the space 4 located directly above the screw. This space 4 left free by the screw permits the water vapors and glycol vapors produced during the reaction to be freely withdrawn through an outlet 5 provided in the top of the vessel 2 and through the tower 7 and the condenser 8 mounted therein. The tower is filled with Raschig rings or the like affording a large surface on which the vapors are condensed.

A continuous stream of the viscous mixture of the starting materials is fed by a suitable pump to the inlet 1 provided in the lefthand end wall of the vessel 2. This stream fills the lower portion of the internal space of the vessel 2 and overflows a dam 6 provided therein near the righthand end wall. Between the dam 6 and that end wall there is provided an outlet 9.

Under the influence of the elevated temperature prevailing within the reactor vessel 2 the starting materials react to form a compound of a type capable of being polycondensed or polymerized. This compound is a viscous material which has a much lower viscosity or, in other words, a higher fluidity, than the mixture entering the vessel through the inlet 1. The shaft of the feed screw 3 extends through bearing openings provided in the end walls of the vessel and is coupled with suitable driving means (not shown) which will impart a continuous rotation to the feed screw causing it to exert a feeding force upon the viscous material directed towards the inlet 1. The feed screw, however, is provided with perforations 10 through the viscous material may flow from the inlet 1 towards the outlet 9 irrespectively of the tendency of the feed screw to push the viscous material in the opposite direction towards the inlet 1. As a result, the viscous material flowing through the elongated space within the vessel from the inlet 1 towards the outlet 9 is subjected to a retaining influence by the screw. This retaining influence will exert a higher force on the more viscous non-reacted portions of the mixture than on the less viscous reacted portions thereof. As a result, the reacted portions only which have a lower viscosity than the mixture of the starting materials will arrive at the dam or weir 6 and will overflow it for discharge through the outlet 9, whereas the more viscous non-reacted portions will be less able to pass the perforations or the gap between the worm and the internal surface of the vessel and, therefore, will be urged by the rotating screw towards the inlet 1 and will thus be retained in the vessel until they will have completely reacted.

The weir or dam 6 controls the level of the viscous material flowing through the reactor vessel 2. Therefore, the quantity of the viscous material present within the internal space 4 of the vessel may be increased by increasing the height of the dam 6. This quantity, however, controls the period of time which the continuous stream of the material requires to pass through the vessel. This period of time should be so chosen as to sufficient to insure a complete reaction. As a result of a complete reaction, all of the non-reacted portions of the mixture will be retained by the screw within the vessel and completely reacted portions of the mixture only will be permitted to overflow the weir 6.

The completely reacted compound discharged through the outlet 9 may be fed into an apparatus for continuously polycondensing or polymerizing it, such as disclosed and claimed in our co-pending patent application filed concurrently herewith.

The continuous esterification can be attained at a temperature of from 200 to 290° C. and at a superpressure of from 0 to 10 atmospheres. Temperatures between 240–270° C. and a superpressure of from 3 to 6 atmospheres are preferred.

While the apparatus described has been originally developed for the purpose of practicing a process for the continuous esterification, it has been found that an apparatus of substantially the same design can also be used for producing glycol esters from aromatic dicarboxylic acid esters and, more particularly, for producing bis(2-hydroxyethyl) terephthalate by transesterification. For this process the same glycols can be used which have been mentioned hereinabove in connection with the process for the esterification. Also the variability of the quantity of the acids and the quantity of the catalyst corresponds to the above described process of esterification.

EXAMPLE 1

The following components were continuously introduced into a mixer (not shown):

Terephthalic acid _____ 100 kg. (1 mol).
Ethylene glycol _____ 93.4 kg. (1.8 mol).
Manganese acetate _____ 0.0065% based on the weight of terephthalic acid.
Antimony trioxide _____ 0.0083% based on the weight of terephthalic acid.

These materials were agitated for a period of two hours and then conducted to the reactor at a rate of 20 kg. per hour through the preheater maintained at 230° C. The reactor was heated to 245° C. and the pressure was maintained at 3 atmospheres. The partial condenser was maintained at 155° C. The residence time of the reaction mass in the reactor was 3.5 hours. The reaction product consisting of bis(2-hydroxyethyl) terephthalate and of a surplus of non-reacted glycol was continuously fed to an apparatus for the continuous polymerization. In this apparatus the reaction product was condensed at a maximum temperature of 280° C. and at an absolute pressure of less than 1 mm. Hg. The polymer thus obtained had a limit viscosity of .53.

EXAMPLE 2

As in the first example, there were introduced into the mixer:

Terephthalic acid _____ 100 kg. (1 mol).
Ethylene glycol _____ 67.2 kg. (1.8 mol).

And as catalysts:

Manganese acetate _____ 0.007% based on the weight of terephthalic acid.
Antimony trioxide _____ 0.0083% based on the weight of terephthalic acid.

These materials were agitated for three hours in the mixer heated to 120° C. They were then fed through the preheater maintained at 240° C. to the reactor at a rate of 20 kg. per hour. The reactor was heated to 260° C. and the superpressure was maintained at 40 atmospheres. As in the first example, the partial condenser temperature was maintained at 155° C. The residence time of the materials in the reactor was four hours. The compound leaving the reactor vessel was polymerized resulting in a product having a limit viscosity of 0.72.

EXAMPLE 3

In the same manner as in the previous examples, the following materials were added to the mixing vessel.

Terephthalic acid _____ 100 kg. (1 mol).
Ethylene glycol _____ 48.6 kg. (1.3 mol).
Manganese acetate _____ 0.010% based on the weight of terephthalic acid.
Antimony trioxide _____ 0.0083% based on the weight of terephthalic acid.
Water _____ 25% based on the weight of terephthalic acid plus the ethylene glycol.

These substances were mixed for three hours in the mixer heated to a temperature of 90° C. The resulting mixture was led through the preheater maintained at 250° C. at a rate of 20 kg. per hour to the reactor. The reactor was heated to 270° C. and the pressure was maintained at 5.2 atmospheres. The partial condenser was maintained at 155° C. Total residence time in the reactor, four hours. The compound so obtained was polymerized and resulted in a product having a limit viscosity of 0.91.

For practicing the process described in the examples the following dimensional and operational figures of the apparatus illustrated in FIG. 1 have been found satisfactory:

| | Mm. |
|---|---|
| Internal diameter of the reactor vessel | 440 |
| The length of its internal space | 1000 |
| The diameter of the feed screw 3 rotatably mounted in the end walls of the reactor vessel | 413 |
| The distance of the periphery of the feed screw from the internal wall of the reactor vessel at the lowermost point thereof | 1.5–2 |
| The heigt of the tower 7 | 2300 |
| The diameter of the tower | 254 |
| The diameter of the perforation 10 in the feed screw these perforations having the small diameter near the discharge end of the vessel and the larger diameter near the inlet end of the vessel | 3–7 |

The speed of rotation of the perforated screw can be controlled between 9.7 and 58 revolutions per minute.

From the foregoing it will be seen that this invention is one well adapted to attain all of the ends and objects hereinabove set forth together with other advantages which are obvious and which are inherent to the process and to the apparatus. The advantages of the invention as here outlined are best realized when all of its features and instrumentalities are combined in one and the same structure, but useful devices may be produced embodying less than the whole.

While the invention has been described in connection with a preferred embodiment thereof, it will be understood that it is capable of further modification and that this application is intended to cover any variations, uses, or adaptations of the invention. Thus, the feed screw 3 may be replaced by other suitable feeding means, such as an endless conveyor carrying perforated wipers moving within the lower section of the vessel from the outlet end to the inlet end and returning to the outlet end above the level of the viscous material within the vessel. The feed screw, however, is preferred because of its greater simplicity and higher efficiency.

What is claimed is:

1. A process for continuously producing a compound of the type capable of being polycondensed or polymerized, said compound being a viscous material resulting from the reaction of (A) a reactant material selected from the group consisting of terephthalic acid and mixtures of terephthalic acid with up to 20% of an acid selected from the group consisting of isophthalic acid, adipic acid, sebacic acid, and hexahydroterephthalic acid; and (B) a reactant material which is an alkylene glycol having the formula $R(OH)_2$ wherein R is $C_nH_{2n}$ and $n$ varies from 2 to 12, which when mixed in a molar ratio of from 1:1.1 to 1:3, constitute a viscous material having a higher viscosity than that of said compound, said process comprising:

(a) mixing said reactant materials (A) and (B);
(b) feeding said mixture of reactant materials (A) and (B) at an inlet at one end of a horizontal reactor which reactor has a discharge at the other end;
(c) heating the mixture of reactant materials (A) and (B) within said reactor to an elevated temperature sufficient to cause said reaction;
(d) exerting a retaining force on the more viscous liquid portion comprising unreacted reactant materials (A) and (B) for a time sufficient to convert said reactant materials (A) and (B) to said compound, while permitting a less viscous liquid portion of said compound to move toward the discharge by rotating a helical impeller having perforated flights, said perforated flights having perforations of larger diameter near the inlet end of the reactor and smaller diameter near the discharge end of the reactor; and
(e) withdrawing said compound from the discharge at the other end of the reactor.

2. The process of claim 1 comprising the additional step of mixing water to the mixture of said reactant materials (A) and (B) before feeding said mixture into said reactor.

3. The process of claim 1 in which the reactant material (A) is terephthalic acid and the reactant material (B) an alkylene glycol.

4. The process of claim 1 in which the reactant material (A) is a mixture of terephthalic acid and up to 20 percent by weight of isophthalic acid.

5. The process of claim 1 wherein the reactant material (B) is ethylene glycol.

6. The process of claim 1 wherein the reactant material (A) is a mixture of terephthalic acid and up to 20 percent by weight of isophthalic acid and the glycol is ethylene glycol.

7. The process of claim 1 in which said glycol is cyclohexyldimethanol.

References Cited

UNITED STATES PATENTS

| | | | |
|---|---|---|---|
| 2,907,753 | 10/1959 | MacLean et al. | 260—475 |
| 3,385,881 | 5/1968 | Bachman et al. | 260—475 |
| 3,253,892 | 5/1966 | Brignae et al. | 260—475 |
| 3,431,243 | 3/1969 | Uno et al. | 260—475 |
| 3,497,473 | 2/1970 | Kemkes et al. | 260—75 |

FOREIGN PATENTS

| | | | |
|---|---|---|---|
| 827,373 | 2/1960 | Great Britain | 260—475 |

LORRAINE A. WEINBERGER, Primary Examiner

E. J. SKELLY, Assistant Examiner

U.S. Cl. X.R.

23—285; 260—75 M